April 25, 1933.    W K. LEVIS    1,905,919
IRRIGATION PIPE SCREEN
Filed March 12, 1932

Inventor
W. Kent Levis
By
Francis C. Huebner,
Attorney.

Patented Apr. 25, 1933

1,905,919

UNITED STATES PATENT OFFICE

W KENT LEVIS, OF SELMA, CALIFORNIA

IRRIGATION PIPE SCREEN

Application filed March 12, 1932. Serial No. 598,477.

My invention relates to a screen and regulator for use over the ends of irrigation pipes. It is well-known that in irrigating, laterals or ditches are usually made to carry a volume of water to be distributed in a plurality of smaller furrows. For this purpose small sections of pipes are buried horizontally in the bank of the lateral with one end projecting through either side of the bank adapted to discharge the water in the furrows. Inasmuch as the laterals frequently contain debris and loose vegetation the intake ends of the pipes become clogged and it is difficult to regulate the amount of water passing therethrough. It is also noted that when the water passes through a pipe without obstruction it naturally starts a whirling movement which washes the soil at the intake end of the pipe.

The object of my invention is the production of a screen to cover the intake end of the pipe which is simple and cheap in construction, which will assist in regulating or limiting the flow of water through the pipe, the screen being held a spaced distance from the outside wall of the intake pipe and a selective spaced distance from the bottom of the screen which is adapted to form a closure for the intake end of the pipe. Another object is the fact that by using my invention on the ends of pipes when irrigtating the whirling of the water is avoided. Other objects will be hereinafter disclosed.

Figure 1:
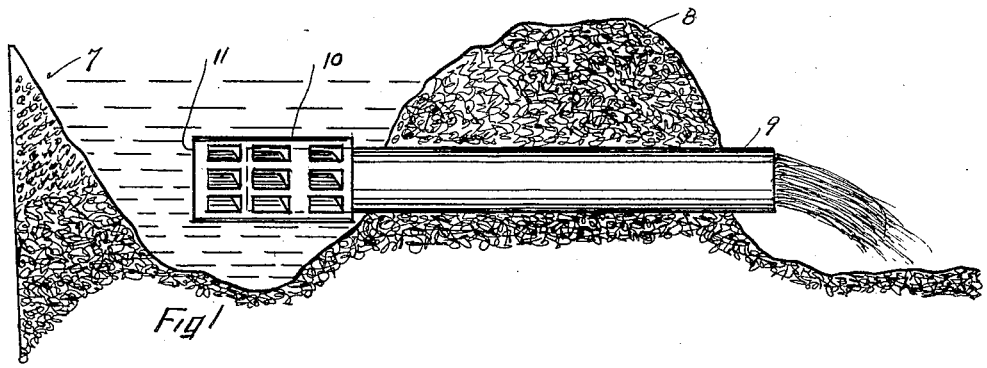
Figure 2:
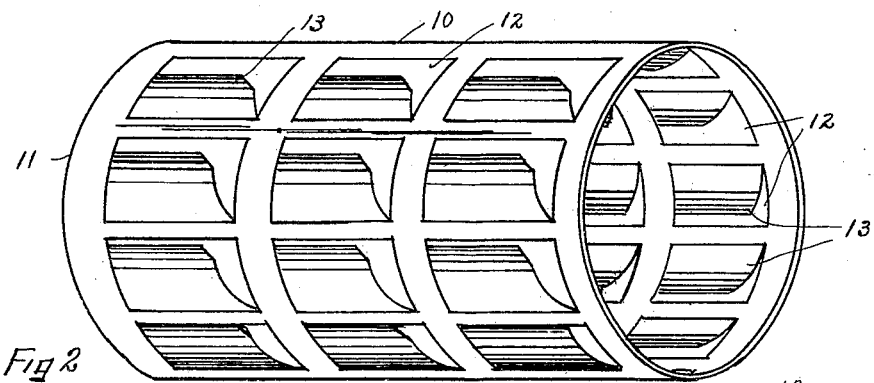
Figures 3, 4:
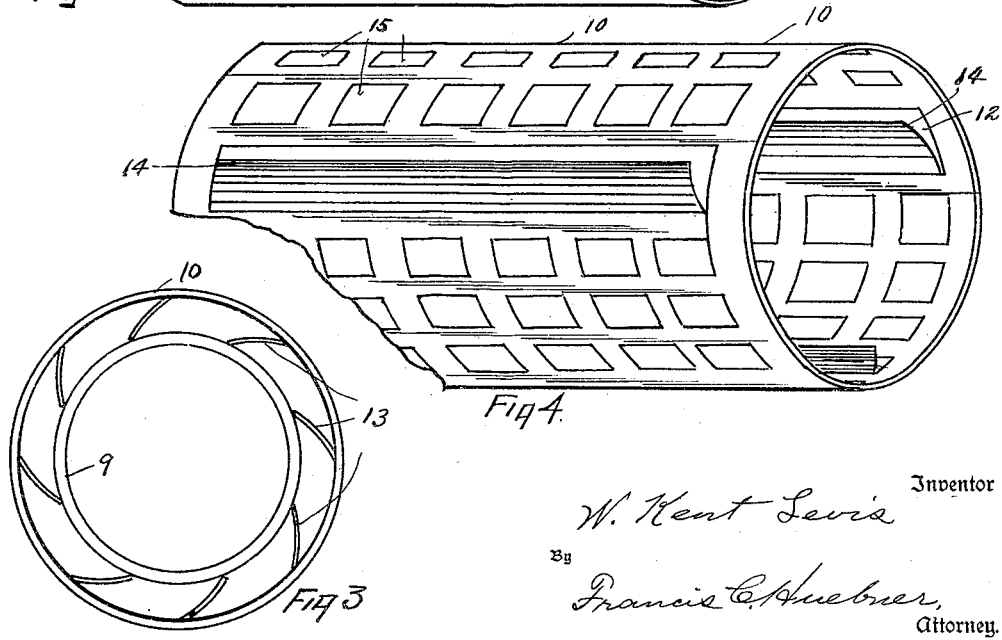

In the drawing herewith which is made a part of this specification, Fig. 1 is a view of my screen assembled with a pipe in use in a lateral, the lateral being shown in section. Fig. 2 is an enlarged view of the screen. Fig. 3 is an end view of the screen. Fig. 4 is a modified form of my screen.

Referring to the drawing the lateral carrying the irrigation water is designated 7. The bank through which the water is conducted is shown as 8 and the pipe 9 conducts the water.

Screen 10 consists of a cup-shaped member having a bottom 11. The wall of the cup has a plurality of openings 12, each opening having the wall cut on three sides of an approximately rectangular form. The lip 13 thus formed is bent preferably in a curve toward the lateral center line of the cup. The length of the lips thus formed and the distance they are bent toward the center of the cup should be such that when the end of the irrigation pipe is inserted within the cup, the lips will yieldingly bear against the outside wall of the pipe and assist in holding the pipe a spaced distance from the inside wall of the cup and to hold the end of the pipe a selective spaced distance from the bottom of the cup. The holding of the walls of the cup and pipe a spaced distance apart permits the water to flow through the apertures along the outside wall of the pipe, while the proximity of the end of the pipe to the bottom of the cup selectively restricts the amount of water let into the pipe.

In Fig. 4 I have shown a modified form in which three of the openings form the lips or spacers 14. These lips are formed from the wall pressed out of elongated slots. Ordinary apertures 15 are auxiliary to the slots for admitting water within the cup and to the intake end of the pipe.

Having described my invention I claim:

1. In combination with an irrigation pipe of a screen adapted to cover the intake end of the pipe consisting of a cup-shaped member having perforations through the side walls, said perforations consisting of pressed in portions of the wall which have been cut on three sides thereof, said pressed in portions being adapted to hold the irrigation pipe a spaced distance from the inside wall of the cup.

2. In combination with an irrigation pipe of a screen adapted to cover the intake end of the pipe consisting of a cup-shaped member having perforations through the side walls, said perforations consisting of pressed in portions of the wall which have been cut on three sides thereof, said pressed in portions being adapted to hold the irrigation pipe spaced distance from the inside wall of the cup, and to hold said pipe at a selective spaced distance from the bottom of said cup.

W KENT LEVIS.